Dec. 5, 1933.  C. LUTE  1,937,769
ADJUSTABLE HOLD-DOWN DEVICE
Filed April 28, 1932   2 Sheets-Sheet 1
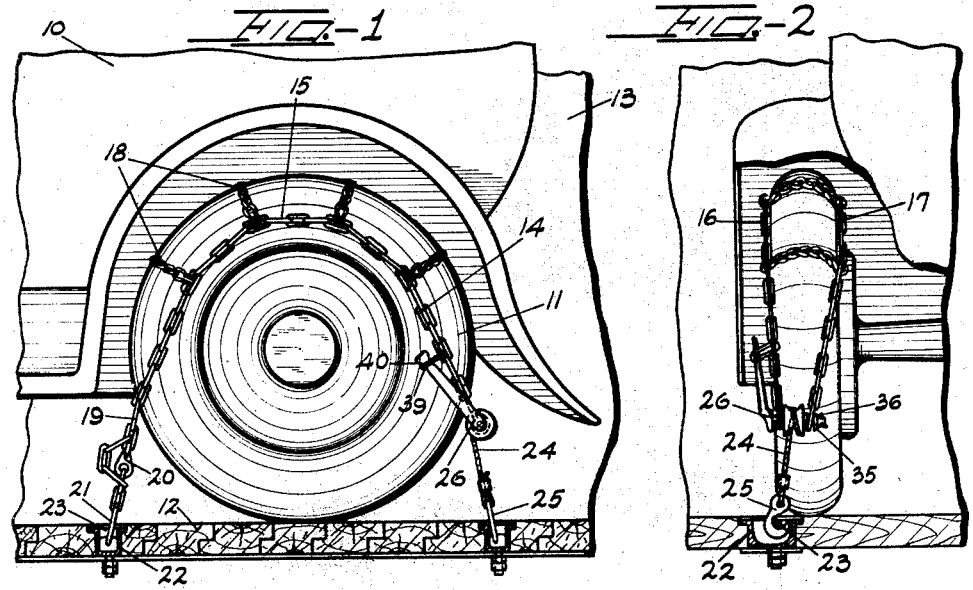
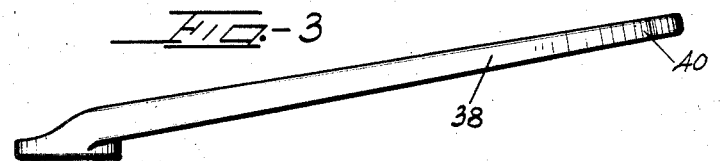
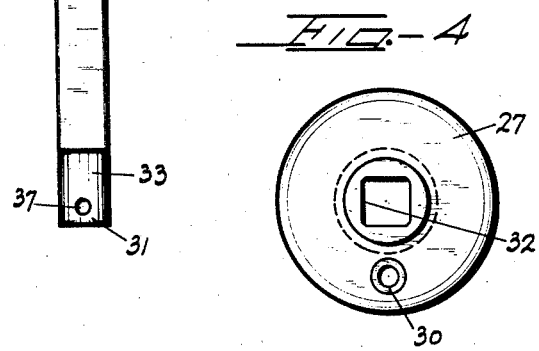
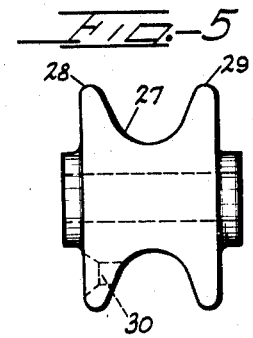
-INVENTOR-
CARL LUTE
By~ Samuel Reese
ATTY.

Dec. 5, 1933. C. LUTE 1,937,769
ADJUSTABLE HOLD-DOWN DEVICE
Filed April 28, 1932 2 Sheets-Sheet 2
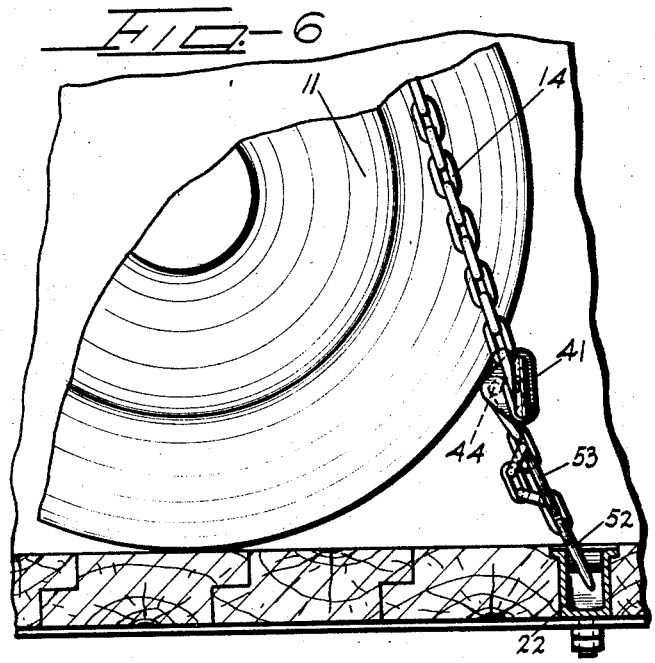
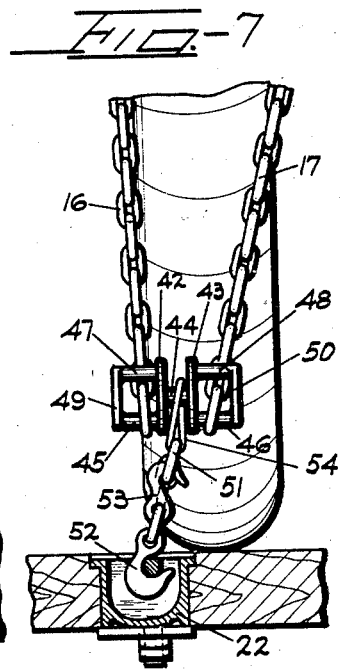
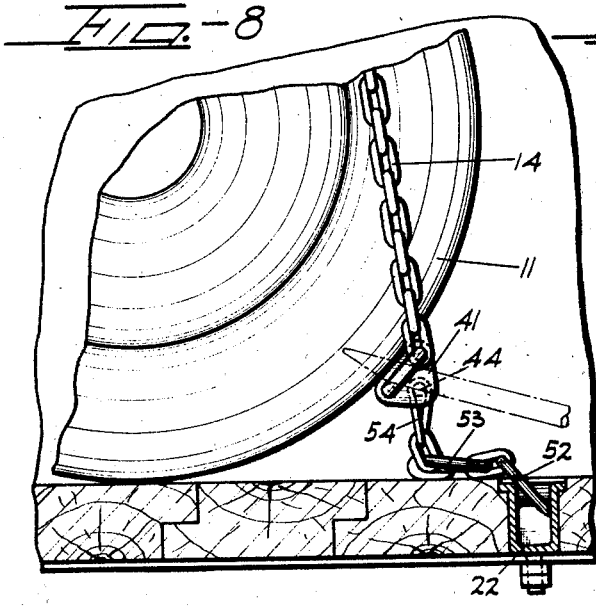
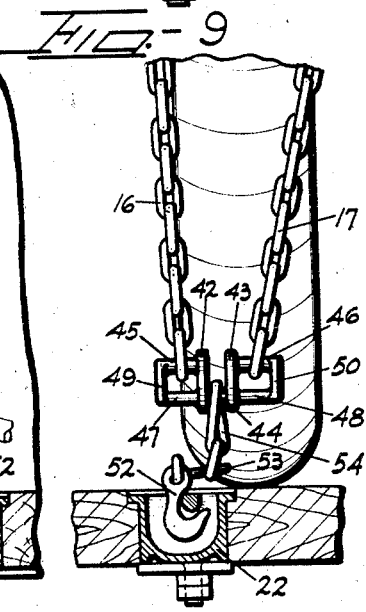
INVENTOR-
CARL LUTE
By~ Samuel Reese
ATTY.

Patented Dec. 5, 1933

1,937,769

UNITED STATES PATENT OFFICE 1,937,769

ADJUSTABLE HOLD-DOWN DEVICE

Carl Lute, Hammond, Ind., assignor to Camel Company, Chicago, Ill., a corporation of Illinois Application April 28, 1932. Serial No. 608,097

19 Claims. (Cl. 188—32)

This invention relates to hold-down devices for automobiles and concerns itself primarily with hold-down devices provided with novel adjusting or tensioning mechanisms.

It is an object of this invention to provide adjusting mechanisms for automobile hold-down devices in which said mechanisms are journaled to permit rotation thereof to tension said devices.

A further object is the provision of a hold-down device comprising vehicle engaging and fastening portions and provided with means journaled in said vehicle engaging portion and engaging a fastening portion whereby to effect adjustment in the length of said device to tension the same.

A further object is to provide a hold-down device comprising vehicle engaging and fastening portions and provided with rotatable means journaled in said vehicle engaging portion and engaging a fastening portion whereby to coil said latter portion upon rotation of said means.

A further object is to provide a hold-down device comprising vehicle engaging and fastening portions and provided with eccentric means journaled in said vehicle engaging portion and engaging a fastening portion whereby to effect adjustment in the length of said device to tension the same.

A further object is to provide adjusting mechanism including a roller capable of being rotatably carried by a hold-down device for effecting adjustment in the length thereof.

A further object is to provide adjusting mechanisms capable of ready assembly with automobile hold-down devices and comprising simple, rugged constructions having relatively few parts.

Other objects of this invention will become clear as the description thereof proceeds.

In the drawings forming part of the specification

Figure 1 is a fragmentary elevation of a freight car showing a hold-down device and adjusting mechanism of the invention applied to the rear wheel of an automobile secured for shipment in said car.

Figure 2 is a partial end view of the structure shown in Figure 1.

Figures 3, 4 and 5 are detail views of the parts of the adjusting mechanism.

Figure 6 is a fragmentary elevation illustrating a modified form of the invention.

Figure 7 is a partial end view of the structure shown in Figure 6.

Figure 8 is a detail view illustrating the modified form of the invention before operation thereof to tension the hold-down device.

Figure 9 is an end view of the structure shown in Figure 8.

Referring to the drawings and to Figures 1 to 5, inclusive, thereof, which illustrate one embodiment of the invention, an automobile 10 is shown with the rear wheels 11 thereof supported upon the floor 12 of a freight car 13, and secured therein against movement relative to the floor of the car during transit thereof. In order to secure said automobile in stationary position upon the floor of the car the adjustable hold-down device of the invention is utilized.

The hold-down device 14 is designed preferably to engage the wheels of the automobile for its intended purpose. It comprises, essentially, a wheel engaging portion 15 providing a plurality of chains 16 and 17 which lie upon opposite sides of the automobile wheel and which are connected by a plurality of spaced cross chains 18 straddling the wheel. By this construction it will be apparent that the wheel engaging portion 15 of the hold-down device 14 may readily engage a portion of the periphery of the automobile wheel in such a manner as to be maintained against transverse and lateral shifting relative to said wheel. Extending from one side of the wheel engaging portion 15 of the hold-down device is a fastening portion 19 preferably in the form of a chain. The fastening portion 19 is provided with a take-up device which, in the present embodiment of the invention, takes the form of a hook 20 carried by one of the links of the fastening portion. The hook 20 obviously may be selectively engaged with a desired link in order to vary the effective length of the fastening portion. It is to be observed, however, that the hook 20 is not effective to apply tension to the hold-down device in order to establish firm engagement between said device and the wheel upon which it is applied. The end of the fastening portion 19 carries a hook 21 which is adapted to engage an anchoring device 22 suitably secured in the floor of the freight car. The engagement between the hook 21 and the anchoring device 22 is effected by engagement between said hook and a cross member 23 provided adjacent the top of the anchoring device.

The opposite side of the wheel engaging portion 15 of the anchoring device is also provided with a fastening portion 24 and includes, additionally, an adjusting or tensioning mechanism cooperating with said wheel engaging portion of the hold-down device and the fastening portion 24 in order to effect adjustment in the length of the hold-down device to apply tension to said device thereby providing secure engagement between it and the wheel to be secured. One end of the fastening portion 24 is provided with a hook 25 similar to the hook 21 of the fastening portion 19. This hook, in the operative position of the fastening device engages the cross member 23 of an anchoring device 22 to effectively secure the fastening portion to the floor of the freight car. Attachment of the opposite end of the fastening portion 24 with the adjacent side of the wheel engaging portion 15 of the hold-down device is obtained through the agency of the tensioning mechanism 26.

In the instant embodiment of the invention the tensioning mechanism comprises a roller 27 provided with end flanges 28 and 29 which are so related with respect to the roller as to give it the appearance of a spool. One of the flanges, such as flange 28, is provided with an opening 30 through which the end of the fastening portion 24 opposite to the hook carrying end is adapted to extend. This end of the fastening portion 24 which, as clearly shown in the drawings, preferably takes the form of a metallic cable, has its strands separated and formed to provide a head adapted to be received within the opening 30 to fasten said end of the fastening portion to the roller. The roller 27 is maintained preferably in a horizontal position between the chains 16 and 17 of the wheel engaging portion 15 of the hold-down device by means of axle 31, the intermediate portion of which is polygonal in section and extends through a correspondingly formed opening 32 in the roller. The ends 33 and 34 of said axle are cylindrical, these cylindrical ends providing trunnions by which said shaft is journaled in links of the chains 16 and 17 of the wheel engaging portion of the hold-down device. A washer plate 35 is positioned on the outside of the chain 17 and maintained in such position by a cotter pin 36 or the like extending through an opening 37 formed in the cylindrical end 33 of the shaft. The opposite end of the shaft 31 is provided, preferably integral therewith, with a lever 38 lying upon the outside of the chain 16. It will be apparent that the washer plate 35 and the end of the lever 38 adjacent to the shaft 31 will maintain the roller 27 in position against disengagement from the wheel engaging portion of the hold-down device.

A hold-down device may, of course, be applied to each wheel of an automobile supported by the floor of the freight car. In such application the wheel engaging portion 15 of the hold-down device is positioned upon the wheel with the lever 38 disengaged from the link 39 carried by the wheel engaging portion of a hold-down device. The hooks 21 and 25 provided on the fastening portions 19 and 24 are then engaged with their corresponding anchoring devices 22 and, if necessary, depending upon the size of the wheel, the hook 20 may be engaged with a desired link in the fastening portion 19 to decrease the effective length of the hold-down device. Thereupon, the hold-down device is tensioned by rotation of the roller 27 through operation of the lever 38 and such tensioning is maintained by the engagement of the link 39 with the free end of the operating lever. In order to provide for a secure engagement between the link and the operating lever, said link is received within a reduced portion 40 of the lever. It will be apparent that the hold-down device will have tight engagement with the wheel to which it is applied and that said wheel will be effectively maintained against movement relative to the floor of the freight car.

Referring now to Figures 6 to 9, inclusive, of the drawings, there is illustrated in these figures a modified form of the invention. Figures 6 and 7 show the modified form of adjusting or tensioning mechanism in its operative position, while Figures 8 and 9 of the drawings illustrate said mechanism in its inoperative position. In this form of the invention the adjusting mechanism 41 comprises a plurality of plate members 42—43 maintained in spaced connected relationship by means of the connecting lobe 44. The plates 42 and 43 are similar in contour and preferably triangular in shape. The connecting lobe 44 is positioned on corresponding apexes of the plates. Trunnions 45 and 46 extend oppositely from said plates and are positioned preferably on other corresponding apexes of the plates. Extending from said plates and positioned on the remaining corresponding apexes of the plates 42 and 43 are lugs 47—48 which, in view of their position are spaced from the trunnions 45 and 46. This spacing of the lugs and the trunnions facilitates the engagement therewith of a lever, shown in dot and dash lines in Figure 8 of the drawings, by which the adjusting mechanism may be operated to apply tension to the hold-down device. The lugs and the trunnions are preferably connected by means of the portions 49 and 50.

The tensioning mechanism 41 is assembled with the hold-down device 14 by positioning the trunnions 45 and 46 within the desired links of the chains 16 and 17 of the wheel engaging portion 15 of the hold-down device. This assembly may readily be accomplished by the insertion of the trunnions 45 and 46 through open ends provided in said links, these ends being subsequently welded or otherwise closed. It will be apparent that the selected links above referred to will serve as bearings for the trunnions 45 and 46 of the adjusting or tensioning mechanism, these links being maintained against disengagement from the trunnions by means of the connecting portions 49 and 50. It is to be understood, however, that the connecting portions 49 and 50 may be dispensed with if desired and any other means, such as washer plates and cotter pins may be employed to maintain the desired engagement between the trunnions and the links. The fastening portion 51 of the hold-down device is constructed essentially similar to the fastening portion 19 of the hold-down device 14. The hold-down device 51 embodies in its chain construction a hook 52 adapted to engage an anchoring device 22 and an intermediate take-up hook 53. The fastening portion 51 is assembled with the adjusting or tensioning mechanism 41 by the engagement of a link 54 of said fastening portion with the connecting lobe 44 of the mechanism. The engagement of the link 54 with the connecting lobe 44 may be obtained by the insertion of the lobe within the link through open ends thereof, whereupon said ends may be welded or otherwise secured together.

Referring to Figures 8 and 9 of the drawings it will be seen that the connecting lobe 44 in the inoperative position of the adjusting mechanism, that is, before tensioning of the hold-down device, lies below the trunnions 45 and 46 of said mechanism. To apply tension to said hold-down device through the agency of the tensioning mechanism 41 a lever may be inserted between the trunnion 45 and lug 47 or between the trunnion 46 and lug 48 and the mechanism rotated within the selected links of the wheel engaging portion as bearings in a counter-clockwise direction, as viewed in Figure 8 of the drawings. During this rotation of the adjusting mechanism it will be apparent that the connecting lobe 44, which is engaged with the fastening portion 51 of the hold-down device will be moved upwardly and assume a position above the trunnions 45 and 46. The rotation of the adjusting mechanism will continue until the connecting lobe 44 has passed laterally beyond the axis of rotation of the trunnions 45 and 46 and above said trunnions, whereupon the lugs 47 and 48 will engage the chains 16 and 17 of the wheel engaging portion of the hold-down device. It is to be noted that the engagement of the lugs with said chains occurs on the side of said chains opposite to that on which the connecting lobe is positioned. The relationship of the adjusting mechanism with the hold-down device when said mechanism is effective to apply tension to said device is clearly shown in Figures 6 and 7 of the drawings. It is believed to be clear from the showing of these figures that the engagement of the hook 52 of the fastening portion with the anchoring device 22 will exert a downward pull upon the connecting lobe 44. However, inasmuch as this lobe has been positioned beyond the axis of rotation of the trunnions the pull of the fastening portion will tend to effect tighter engagement between the lugs 47 and 48 and the chains 16 and 17 of the wheel engaging portion. To release the tensioning mechanism it is only necessary to force the connecting lobe in a clockwise direction beyond the axis of rotation of the trunnions 45 and 46, whereupon said mechanism will immediately assume a released position.

It will be clear that numerous changes and modications in the structural details of the illustrated embodiments of the invention will be apparent to those skilled in the art. It is intended, consequently, that all such changes and modifications shall be comprehended within this invention, which is to be limited only by the scope of the claims appended hereto.

I claim:

1. A hold-down device for automobiles comprising an intermediate flexible wheel engaging portion, flexible end fastening portions, means for decreasing the effective length of the hold-down device but ineffective to tension said device, and means for adjusting the length of said device for tensioning the same.

2. A hold-down device for automobiles comprising a wheel engaging portion, a fastening portion secured to said wheel engaging portion, tensioning means journaled in said wheel engaging portion and a flexible fastening portion secured to said means.

3. A hold-down device for automobiles comprising a flexible wheel engaging portion composed of links, a fastening portion secured to said wheel engaging portion, tensioning means journaled in said links of said wheel engaging portion and a flexible fastening portion connected to said means.

4. A hold-down device for automobiles comprising an intermediate flexible wheel engaging portion, including chains adapted to lie on opposite sides of a wheel of an automobile, an end fastening portion secured to said intermediate portion, means positioned between and journaled in said chains, a flexible end fastening portion secured to said means and a lever for rotating said means to coil said flexible fastening portion thereupon.

5. A hold-down device for automobiles comprising a flexible automobile wheel engaging portion, a flexible fastening portion, a roller journaled in one of said portions and operatively engaging the other of said portions, and means for rotating said roller to take up said engaging portion for the purpose set forth.

6. A hold-down device for automobiles comprising a wheel engaging portion, a fastening portion secured to said wheel engaging portion, a flanged roller journaled in said wheel engaging portion, a flexible fastening means secured to a flange of said roller and means to rotate said roller for the purpose set forth.

7. A hold-down device for automobiles comprising a vehicle engaging portion, tensioning means journaled in said vehicle engaging portion, and a flexible fastening portion secured to said tensioning means for the purpose set forth.

8. A hold-down device for automobiles comprising a vehicle engaging portion, a horizontally positioned roller suspended by said vehicle engaging portion, a flexible fastening portion secured to said roller and means for rotating said roller to coil said fastening portion thereon for the purpose set forth.

9. A hold-down device for automobiles comprising a vehicle engaging portion, rotatable means journaled in said vehicle engaging portion, a flexible fastening portion secured to said rotatable means, an operating lever for rotating said means to coil said fastening portion thereon and tension said device and means carried by said device adapted to engage and retain said lever after the tensioning operation.

10. The combination with a freight car, of a hold-down device for securing an automobile to the floor of said car comprising an intermediate portion having peripheral engagement with a wheel of said automobile, a fastening member secured to said intermediate portion and fastened to said floor, a flexible fastening member fastened at one end to said floor and at its other end to rotatable means journaled in said intermediate portion and means for rotating said rotatable means for the purpose set forth.

11. A hold-down device for automobiles comprising a vehicle engaging portion, eccentric tensioning means journaled in said vehicle engaging portion, and a fastening portion secured to said tensioning means for the purpose set forth.

12. A hold-down device for automobiles comprising a vehicle engaging portion, a fastening portion and a tensioning mechanism, said mechanism including a pair of plates, aligned trunnions extending in opposite directions from said plates journaled in said device, oppositely projecting lugs carried by said plates, and means securing said plates in spaced relation and connected to said fastening portion, the trunnion and lug on each of said plates and said connecting means lying on the apexes of a triangle.

13. A hold-down device for automobiles comprising a vehicle engaging portion, an adjusting mechanism provided with means journaled in said device, a lug spaced from said means, and an attaching member and a fastening portion connected to said attaching member, said means, lug and attaching member lying on the apexes of a triangle.

14. A hold-down device for automobiles comprising a vehicle engaging portion, a fastening portion and a tensioning mechanism, said mechanism having trunnions journaled in said vehicle engaging portion and means for connecting said fastening portion to said mechanism, said means lying below said trunnions in the released position of said mechanism, said mechanism being rotatable about said trunnions to position said means above a lateral offset beyond the axis of rotation of said trunnions in the direction of rotation of said mechanism to tension said device.

15. A hold-down device for automobiles comprising a vehicle engaging portion, an adjusting mechanism having trunnions journaled in said vehicle engaging portion, connecting means provided on said mechanism below said trunnions and a fastening portion attached to said means, said mechanism being rotatable about said trunnions to tension said device whereby to so position said means relative to said trunnions that the tension of said device tends to impart a continued rotation to said mechanism, and means for preventing said continued rotation.

16. A hold-down device for automobiles comprising a vehicle engaging portion, tensioning means journaled in said vehicle engaging portion, and a fastening portion secured to said tensioning means for the purpose set forth.

17. A hold-down device for automobiles comprising a vehicle engaging portion, a fastening portion and a tensioning mechanism, said mechanism having trunnions journaled in said vehicle engaging portion and means for connecting said fastening portion to said mechanism, said means lying below said trunnions in the released position of said mechanism, said mechanism being rotatable about said trunnions to position said means above a lateral offset beyond the axis of rotation of said trunnions in the direction of rotation of said mechanism to tension said device and means to limit rotation of said mechanism.

18. A hold-down device for automobiles comprising a vehicle engaging portion, a fastening portion and a tensioning mechanism, said mechanism having trunnions journaled in said vehicle engaging portion and means for connecting said fastening portion to said mechanism, said means lying below said trunnions in the released position of said mechanism, said mechanism being rotatable about said trunnions to position said means above a lateral offset beyond the axis of rotation of said trunnions in the direction of rotation of said mechanism to tension said device and means to limit rotation of said mechanism, said means comprising lugs provided on said mechanism engageable with the vehicle engaging portion of said device.

19. A hold-down device for automobiles comprising a wheel engaging portion, a fastening portion extending from said wheel engaging portion, tensioning mechanism, said wheel engaging portion providing bearings to rotatably receive said mechanism, connecting means and a lug provided on said mechanism and a second fastening portion connected to said means, said mechanism being rotatable to apply tension to said device, said lug engaging said wheel engaging portion and lying on the opposite side of said bearings from said connecting means to maintain the tension in said device.

CARL LUTE.